United States Patent [19]
Campbell et al.

[11] 3,882,030

[45] May 6, 1975

[54] SELF-LUBRICATING BEARING ELEMENTS

[75] Inventors: Mahlon E. Campbell, Overland Park, Kans.; William D. Walker, Independence, Mo.

[73] Assignee: Phillips Petroleum Company, Bartlesville, Okla.

[22] Filed: Feb. 15, 1974

[21] Appl. No.: 443,083

[52] U.S. Cl. .................................................. 252/12
[51] Int. Cl..... C10m 7/40; C10m 7/06; C10m 7/02
[58] Field of Search ........... 252/12, 12.2, 12.4, 12.6

[56] References Cited
UNITED STATES PATENTS

| | | | |
|---|---|---|---|
| 3,285,850 | 11/1966 | Graham | 252/12 |
| 3,354,129 | 11/1967 | Edmonds et al. | 260/37 R |
| 3,567,504 | 3/1971 | Hopkins et al. | 252/12 |
| 3,592,783 | 7/1971 | Edmonds | 252/12 |
| 3,730,893 | 5/1973 | Bilow et al. | 252/12 |

*Primary Examiner*—Delbert E. Gantz
*Assistant Examiner*—I. Vaughn

[57] ABSTRACT

Bearing composition:
a. polyarylene sulfide
b. inorganic lubricants.

10 Claims, No Drawings

SELF-LUBRICATING BEARING ELEMENTS

This invention relates to self-lubricating molded composite materials.

In recent years a wide variety of polymeric materials have been used in the formation of bearings or bearing surfaces. Polymeric materials which have been used as bearings include poly(tetrafluoroethylene), polyamides, polyacetals, phenolformaldehyde resins and the like. Such materials have been used for forming bearing surfaces for use in applications where additional lubrication is generally to be avoided and in medium to light load bearing applications. While bearings formed from the various polymeric materials have proven useful for many purposes, such bearings and bearing surfaces have limited utility due to their inability to carry heavy loads and their instability to heat.

It is therefore an object of this invention to provide a novel self-lubricating bearing composition.

It is another object to provide a method for the preparation of a molded self-lubricating bearing composition.

Other aspects, objects, and advantages of this invention will be readily apparent to those skilled in the art from the reading of the following disclosure.

In accordance with one embodiment of the present invention there is provided a self-lubricating bearing composition which consists essentially of an arylene sulfide polymer and at least one solid lubricating component.

In another embodiment of the present invention there is provided a method for the preparation of a molded, self-lubricating polymeric bearing composite of an arylene sulfide polymer and at least one solid lubricating component, which comprises admixing the arylene sulfide polymeric material and at least one solid lubricating component and thereafter molding the resultant admixture under conditions of time, temperature and pressure necessary to effect formation of the bearing composite.

In a further embodiment of this invention, such solid bearing composite is formed by admixing the polymeric material and the solid lubricating component, heating the resultant admixture at a first temperature for a first interval, and molding the thus-heated admixture as described above.

In a still further and presently preferred embodiment of this invention a solid, molded, self-lubricating polymeric composite of an arylene sulfide polymer and at least one solid lubricating component is prepared by a method which comprises the steps of:

a. admixing said polymer and at least one solid lubricating component;
b. heating the resulting admixture at a first temperature for a first interval;
c. thereafter heating the admixture at a second, higher temperature for a second interval;
d. cooling and grinding the thus-heated admixture;
e. compressing the ground admixture of step (d) in a mold at a first pressure;
f. heating the thus-compressed composition at a third temperature for a third interval;
g. thereafter, molding the composition of step (f) at a second pressure;
h. cooling the thus-molded composite under said second pressure to a fourth temperature; and
i. thereafter removing from the mold the finished self-lubricating composite.

The arylene sulfide polymers which are useful in the formation of the solid, self-lubricating bearing composite materials of this invention are those formed by the reaction of at least one polyhalo-substituted monocyclic aromatic compound with an alkali metal sulfide. Such polymers are well known in the art and are disclosed in U.S. Pat. No. 3,354,129 of Edmonds and Hill. Such polymers should have an inherent viscosity of at least 0.01, preferably at least 0.10, as measured in 1-chloronaphthalene at 206° C. at a polymer concentration of 0.4 grams per 100 ml of solvent. Such polymers should have a crystalline melt point above about 400° F.

The solid lubricating components useful in the present invention are those selected from the group consisting of molybdenum disulfide, molybdenum diselenide, graphite, antimony trioxide, tungsten disulfide, tungsten diselenide and mixtures thereof. The lubricating component can be of any suitable lubricating grade or quality. Where molybdenum disulfide is used, it should be free of flotation oil.

In a presently preferred embodiment, the solid lubricating component is formed of a mixture of molybdenum disulfide and antimony trioxide having a weight ratio of molybdenum disulfide to antimony trioxide in the range of 35:65 to 75:25. In a more preferred embodiment, the lubricating component is a 55:45 by weight mixture of molybdenum disulfide and antimony trioxide, respectively.

The proportion of such lubricating component to the arylene sulfide polymer can vary over a wide range. The composition can contain from about 10 to about 90 weight percent lubricating component, based on the total composition, preferably from about 50 to about 85 weight percent lubricating component.

The composition of this invention can also contain fillers which do not substantially lessen the improvement in physical properties of the compositions into which they are incorporated. Such fillers include pigments, reinforcing materials such as glass fibers, asbestos fibers, carbon fibers, boron fibers, glass fiber fabric, wire mesh and the like. Powdered metals such as bronze, silver, nickel, cobalt and lead can also be employed. When used, such materials can be present in amounts ranging from 0 to about 80, preferably 0 to about 50 weight percent of the total composite. The proportions of polymer, lubricating components and other components (if any), are such that the mixture provides a moldable composition.

In the preparation of the self-lubricating molded composites of this invention, weighed quantities of the desired ingredients are first blended or mixed thoroughly. Blending can be done in any suitable manner using conventional blending apparatus. The polymer and lubricating component ingredients should be in particulate form. Preferably, the ingredients should be finer than 60 mesh (U.S. Standard Sieve Series).

If desired, an inert diluent can be employed in mixing of the ingredients. Such diluent should be easily removable from the admixture in order not to interfere with later processing steps. Examples of suitable diluents are the halogenated hydrocarbons.

The thus-mixed admixture is then heated in the presence of air at a first temperature for a first interval. Generally, the first temperature will be in the range of about 25° to about 125° F., preferably about 50° to about 100° F., below the melt point of the polymer. The melt point of arylene sulfide polymers can be readily determined by differential thermal analysis (DTA) by heating a 10 mg. sample of the polymer in a DTA apparatus at a rate of 10° C. per minute. The melt point is taken from the DTA thermogram in a conventional manner. The time during which the mixture is held at such temperature will be sufficient to effect pre-cure and reduce the melt flow, and generally will range from 0.5 to 72 hours, usually from about 1 to 24 hours.

The thus-heated admixture is then heated at a second, higher temperature for a second interval. Generally, the second temperature will be in the range of 0° to 100° F. above the melt point of the polymer. The times during which the mixture is held at such second temperature is in the range of from about 10 to about 90 minutes, usually from 30 to 60 minutes.

Following the second heating step, the admixture is cooled and ground to a convenient particle size, preferably 60 mesh.

The thus-ground admixture is then compacted in a mold at ambient temperature under a compaction pressure in the range of 500 to 5,000 psig. Reinforcing materials or structures such as fabrics of glass fiber or wire mesh can be incorporated into the molding operation at this time.

The compacted admixture is then heated at compaction pressure to a third temperature for a third interval. The third temperature should be in the range of 0° to about 400° F. above the melt point of the polymeric material. The time during which the admixture is held at this third temperature under compaction pressure will be sufficient to produce the desired configuration without significant thermal degradation of the polymeric material. This time is dependent, inter alia, upon mold configuration, the polymeric material, particle size and the like. In general, this time will be in the range of one minute to about one hour.

The heated, compacted admixture is then molded at said third temperature at a pressure in the range of 3,000 to 10,000 psig.

The thus-molded composite is then allowed to cool at molding pressure to a temperature of about 300° F. or lower, after which the molded article is removed from the mold. If necessary, the molded article can be machined to complete the desired configuration.

Although the present invention is described in terms of compaction molding, it is not intended that the present invention be limited thereto. Other molding methods, such as injection molding, can be used.

The self-lubricating compositions of this invention are useful in a variety of applications. The composites can be used as journal bearings, journal bushings, ball-bearing cages, compressor pistons, end fittings, thrust washers, face seals, guides, valve seats, wear rings, gears, cams and the like.

In the examples which follow, the arylene sulfide polymer which was utilized in preparing the self-lubricating composite materials of this invention was a commercial poly(phenylene sulfide) (PPS) having the following properties: inherent viscosity, about 0.17; melt flow, about 13.4 (after heating about 6 hours at 500° F.); sulfur content, about 29.0 weight percent; dichlorobenzene content, about 0.2 ppm; and a particle size of 99% smaller than 60 mesh.

The solid lubricating components used in preparing the composite materials of this invention were molybdenum disulfide having a particle size in the range of 0.5 to 40 microns, and antimony trioxide having a particle size of about 200 mesh.

EXAMPLE I

Composite Preparation

Solid, self-lubricating composite materials of this invention were prepared according to the following procedure:

a. Weighed portions of each component were thoroughly mixed in a high speed blender using a low boiling liquid halohydrocarbon as a blending aid.

b. The well mixed slurry was poured into a flat stainless steel pan and the volatile blending aid was allowed to evaporate.

c. The pan was placed in an air-circulating oven at 500° F. for 12–14 hours. The temperature was increased to 700° F. and held there for one hour.

d. The admixture was reground to powder form.

e. A portion of the ground powder was placed in a die and compacted at ambient temperature under a pressure at 2,000 to 3,000 psig.

f. The die was then heated to 750° F. using radio-frequency modulation heating. The above temperature and pressure were maintained for 30 minutes after which the pressure was increased to 3,000 to 4,000 psig. After 5 minutes at the increased pressure, the heat was turned off and the composite and die were allowed to cool under load to 300° F. The composite was then removed from the die and bored or otherwise machined, as necessary, to complete the specific bearing configuration.

The composite materials are identified as follows; amounts of each component are given in terms of weight percent, based on the total composite:

| Designation | PPS | MoS$_2$ | Sb$_2$O$_3$ |
|---|---|---|---|
| A | 16.7 | 45.8 | 37.5 |
| B | 23.0 | 42.4 | 34.6 |
| C | 28.6 | 39.6 | 32.1 |
| D | 33.3 | 36.7 | 30.0 |

EXAMPLE II

High Temperature Compressive Strength

The high compressive strength of one of the composite materials of this invention was shown in a series of load deflection tests. Composite material A was formed into flat test specimens having an approximate diameter of 0.9 inch according to the procedure of Example I. The test specimens were ground flat to an approximate thickness of 0.04 inch. Deflection measurements were made using a hydraulic press for loading and a dial indicator to determine the amount of deflection at temperatures between ambient and 600° F. Tests were terminated when the dial indicator would not stabilize after the load was applied, thus indicating that yield stress had been exceeded. The results of these tests are given in Table I.

Table I

| Temperature, °F. | Compressive Strength, psi |
|---|---|
| Room temperature | 24,000 |
| 300 | 21,000 |
| 600 | 13,000 |

These data show unusually high compressive strength for the bearing. Moreover, substantial strength is retained at temperatures as high as 600° F.

EXAMPLE III

Journal Bearing Tests

Journal bearings were formed from compositions A-D according to the procedure of Example I, by compacting the composite materials directly into the base of spherical seats which were positioned within the die before addition of the powdered material. The resulting moldings were then bored to fit a 0.625 in. diameter test shaft having a surface finish of 6–10 μin. rms.

For purposes of comparison, several commercially available bearing materials were also tested. These materials are identified as follows:

E. Duroid 5813, a product of Rogers Corp., Rogers, Conn., containing polytetrafluoroethylene (PTFE), molybdenum disulfide fiber glass.

F. Duroid 4300, a product of Rogers Corp., Rogers, Conn., containing bronze, PTFE and fiber glass.

G. Garlock DU, a product of Garlock, Inc., Cherry Hill, N.J., a steel-back-porous bronze material filled with PTFE and lead and having a thin surface layer of PTFE and lead.

H. Feurlon CT, a product of Rogers Corp., Rogers, Conn., containing a polyamide, graphite and PTFE.

I. Rulon A, a product of Dixon Corp., Bristol, R.I., containing PTFE, fiber glass and iron oxide.

Commercial materials F, G and H were purchased as off-the-shelf bushings. Materials E and I were purchased as flat stock which were machined to fit the bearing configuration of this test. Bearings of materials E, G and I were 0.625 in. diameter by 0.504 to 0.545 in. long and materials F and H were 0.5 in. diameter by 0.5 in. long. Invention bearings A-D were 0.5 in. diameter and 0.545 in. long.

The journal bearing tests were carried out on a high speed journal bearing tester. Test shafts were hardened dowel pins having diameters appropriate to the bearings under test. The journal was the ball of a standard ⅝ in. diameter spherical bearing. Load was applied to the bearing by dead weighing the hanger in which the spherical bearing was mounted. Each test station was driven directly by a 1 h.p. AC synchronous motor. Torque was sensed by a linear transducer in contact with the load hanger. Torque was recorded on an external recorder. Bushing, journal and shaft temperatures were monitored by an infrared pyrometer device in conjunction with thermocouples.

The test data contained in Table II include PV, product of load (psi) and speed (fpm), test duration (hours), wear factor, coefficient of friction ($\mu$) and maximum shaft temperature.

Wear factor, $K$, was calculated using the formula $$K = r/PVT$$

wherein $r$ is radial wear in inches, $P$ is load in psi, $V$ is velocity in fpm, and $T$ is time in hours.

Table II

| Run | Material | P | PV | T | K×10^10 | $\mu$ | Max. Shaft Temp.(°F) |
|---|---|---|---|---|---|---|---|
| 1 | A | 60 | 35280 | 175.4 | 50 | 0.01–.09 | * |
| 2 | B | 120 | 35280 | 125 | 63 | 0.04–.12 | * |
| 3 | C | 120 | 35280 | 123.6 | 63 | 0.06–.12 | 200 |
| 4 | D | 240 | 35280 | 124 | 77 | 0.02–.05 | * |
| 5 | E | 120 | 35280 | 125 | 54 | 0.28–.35 | 440 |
| 6 | F | 120 | 28320 | 10.7 | 46 | 0.06–.15 | 410 |
| 7 | G | 120 | 35280 | 9.2 | 108 | 0.12 | 290 |
| 8 | H | 60 | 28260 | 42.5 | 158 | 0.17–.20 | 353 |
| 9 | I | 90 | 26460 | 7.7 | 372 | 0.20–.25 | * |

*Not measured.

Runs 1–4 illustrate that bearings prepared according to the process of this invention exhibit relatively low wear rates, coefficient of friction and/or heat buildup in the test shaft as compared to the commercially available materials of runs 5–9.

EXAMPLE IV

Oscillatory Sliding Friction and Wear Tests

Oscillatory sliding friction and wear tests were performed using a sliding friction and wear tester which employs a flat-on-flat test configuration. A dead weight and lever system applies the load to the upper test specimen. Test loads from 150 to 1,500 pounds can be applied to this test specimen which is in contact with a steel wear plate. Contact area can be varied from 0.1 to 1.0 sq. in. Contact stresses can be varied from 150 psi to 15,000 psi. The wear plate is driven in a nearly sinusoidal reciprocating motion by a crank, pitman and slider. Speed of the reciprocating wear plate is adjustable from 2 to 60 strokes per minute. Stroke is adjustable from 1 inch to 4 inches in ½ inch increments. Friction force is measured by a strain gage link in the constraint linkage of the test specimen holder and is recorded on a strip chart recorder.

The results of these tests are given in Table III.

TABLE III

| Run | Material | P | PV | T | K×10^10 | $\mu$ |
|---|---|---|---|---|---|---|
| 10 | A | 1500 | 18,000 | 167 | 16 | 0.07–.20 |
| 11 | A | 1500 | 36,000 | 167 | 4 | 0.05–.13 |
| 12 | A | 1500 | 54,000 | 158.4 | 4 | 0.07–.18 |
| 13 | B | 6000 | 72,000 | 167 | 9 | 0.04–.11 |
| 14 | B | 6000 | 144,000 | 167 | 3 | 0.06–.20 |
| 15 | E | 486 | 17,496 | 166 | 72 | 0.13 |
| 16 | I | 486 | 17,496 | 166 | 35 | 0.15–.20 |

Runs 10–14 illustrate the low wear rate and coefficient of friction of sliding bearings prepared according to this invention over a wide range of PV values as compared to the commercially available materials tested in runs 15 and 16.

EXAMPLE V

Ball Bearing Retainer Tests

Ball bearing retainers (cages) were fabricated according to the method of the present invention for use in size 204, 15° angular contact type ball bearings. Primary bearing material was 52100 steel. The retainers were molded and/or machined to the desired I.D., O.D. and width, followed by drilling of the ball pockets.

The bearing assemblies were tested on a Rolling Element Bearing Tester at various speeds, radial loads and temperatures. The bearings were run completely dry with no added lubricant.

The results of these tests are given in Table IV. Included in these tests were bearings having steel, phenolic and unfilled poly(phenylene sulfide) retainers which were operated without added lubricant for comparative purposes.

Table IV

| Run | Retainer Material | Speed (rpm) | Load (lb) Thrust | Load (lb) Radial | Test Duration (hours) | Bearing Condition | Remarks |
|---|---|---|---|---|---|---|---|
| 17 | Steel | 3450 | 10 | 5 | 0.1 | Damaged | Terminated due to high friction |
| 18 | Steel | 3450 | 40 | 20 | 0.1 | Damaged | Terminated due to high friction |
| 19 | Phenolic | 3450 | 10 | 5 | 10.0 | Damaged | Terminated due to high friction |
| 20 | PPS* | 3450 | 10 | 5 | 5.0 | Damaged | Terminated due to high friction |
| 21 | A | 3450 | 40 | 20 | 340 | No damage | Cage fracture |
| 22 | C | 3450 | 10 | 5 | 300 | No damage | Ball pockets worn through |
| 23 | C | 3450 | 40 | 20 | 600 | No damage | Ball pockets worn through |
| 24 | C | 3450 | 40 | 20 | 600 | No damage | No failure |
| 25 | C | 6400 | 10 | 5 | 22 | No damage | Cage fracture |
| 26 | C | 10200 | 40 | 20 | 59 | No damage | Cage fracture |
| 27 | C | 10200 | 40 | 20 | 113 | No damage | Retainer worn out-of-round |
| 28[1] | C | 3450 | 40 | 20 | 256 | No damage | No failure |

[1]Heat added to operate at 300° F.; all other tests at ambient temperature.
*Unfilled poly(phenylene sulfide), molding grade C-100, available commercially from Phillips Petroleum Company.

The data in Table IV illustrate the ability of ball bearing retainers prepared according to the present invention to withstand high speeds and loading without additional lubrication. The steel retainers of runs 17 and 18 were operable for only a matter of minutes. The synthetic retainers of runs 19 and 20 were operable for up to 10 hours. In contrast, run 22 demonstrates that a bearing retainer of this invention ran for 300 hours under conditions similar to conditions used in control runs 17, 19 and 20.

Runs 25–27 demonstrate the ability of retainer rings prepared according to this invention to withstand high speeds and loading for long periods of time.

Run 28 demonstrates the ability of a retainer ring of this invention to operate, without additional lubrication, under high ambient temperature, with a bearing life in excess of 250 hours.

Further modifications and variations may be made by those skilled in the art without departing from the spirit and scope of the invention as defined herein and in the appended claims.

We claim:

1. A self-lubricating polymeric composition consisting essentially of an arylene sulfide polymer and a solid lubricating component consisting of a mixture of molybdenum disulfide and antimony trioxide in a weight ratio of molybdenum disulfide to antimony trioxide ranging from 35:65 to 75:25.

2. The composition of claim 1 wherein said solid lubricating component is present in said composition in an approximate amount ranging from 10 to 90 weight percent.

3. The composition of claim 2 wherein said weight ratio is 55:45.

4. The composition of claim 1 wherein said polymer is polyphenylene sulfide.

5. A method of forming a solid self-lubricating composite consisting essentially of an arylene sulfide polymer and at least one solid lubricating component selected from the group consisting of molybdenum disulfide, molybdenum diselenide, graphite, antimony trioxide, tungsten disulfide, tungsten diselenide, and mixtures thereof which comprises the steps of:
   a. admixing said polymer and at least one of said solid lubricating components;
   b. heating the resulting admixture at a first temperature for a first interval;
   c. thereafter heating said admixture at a second, higher temperature for a second interval;
   d. thereafter cooling and grinding said thus-heated admixture;
   e. compressing the thus-ground admixture of step (d) in a mold at a first pressure;
   f. heating the thus-compressed composition at a third temperature for a third interval;
   g. thereafter, molding the composition of step (f) at a second pressure;
   h. cooling the thus-molded composition under said second pressure to a fourth temperature; and
   i. thereafter removing from the mold the finished self-lubricating composite.

6. The method of claim 5 wherein said first temperature is in the range of 25° to 125° F. below the melt point of said polymer and said first interval is in the range of 0.5 to 72 hours;
said second temperature is in the range of 0° to 100° F. above the melt point of said polymer and said second interval is in the range of about 10 to about 90 minutes;
said first pressure is in the range of 500 to 5,000 psig;
said third temperature is in the range of 0°–200° F. above the melt point of said polymer and said third interval is in the range of 1 minute to about 1 hour;
said second pressure is in the range of 3,000 to 10,000 psig; and said fourth temperature is not greater than 300° F.

7. The method of claim 6 wherein said solid lubricating component is present in said composite in an approximate amount ranging from 10 to 90 weight percent.

8. The method of claim 7 wherein said solid lubricating component is a mixture of molybdenum disulfide and antimony trioxide in a weight ratio of molybdenum disulfide to antimony trioxide ranging from 35:65 to 75:25.

9. The method of claim 8 wherein said weight ratio is 55:45.

10. The method of claim 5 wherein said polymer is polyphenylene sulfide.

* * * * *